United States Patent
Sasaki (10) Patent No.: US 8,531,546 B2
(45) Date of Patent: Sep. 10, 2013

(54) IMAGE PROCESSING APPARATUS HAVING A BUFFER MEMORY FOR IMAGE DATA STORAGE

(75) Inventor: Gen Sasaki, Osaka (JP)

(73) Assignee: Mega Chips Corporation, Osaka-shi (JP)

( * ) Notice: Subject to any disclaimer, the term of this patent is extended or adjusted under 35 U.S.C. 154(b) by 29 days.

(21) Appl. No.: 13/230,068

(22) Filed: Sep. 12, 2011

(65) Prior Publication Data

US 2012/0002080 A1    Jan. 5, 2012

Related U.S. Application Data (62) Division of application No. 10/811,840, filed on Mar. 30, 2004, now abandoned.

(30) Foreign Application Priority Data

Mar. 31, 2003 (JP) ................................. 2003-093075

(51) Int. Cl.
H04N 5/228 (2006.01)
H04N 5/76 (2006.01)

(52) U.S. Cl.
USPC .................................. 348/222.1; 348/231.99

(58) Field of Classification Search
USPC ................... 348/223.1, 224.1, 231.99, 231.1, 348/231.2, 231.7–231.9
See application file for complete search history.

(56) References Cited

U.S. PATENT DOCUMENTS

| | | | |
|---|---|---|---|
| 5,694,166 A | 12/1997 | Fukushima | |
| 6,002,446 A | 12/1999 | Eglit | |
| 6,137,534 A | 10/2000 | Anderson | |
| 6,233,010 B1 | 5/2001 | Roberts et al. | |
| 6,400,471 B1 | 6/2002 | Kuo et al. | |
| 6,563,535 B1 | 5/2003 | Anderson | |
| 6,847,388 B2 | 1/2005 | Anderson | |
| 6,914,632 B1* | 7/2005 | Kim ............................. 348/308 | |
| 2001/0019362 A1 | 9/2001 | Nakamura et al. | |

FOREIGN PATENT DOCUMENTS

| | | |
|---|---|---|
| JP | 61-164377 | 7/1986 |
| JP | 5-128232 | 5/1993 |
| JP | 6-245013 | 9/1994 |
| JP | 9-245157 | 9/1997 |
| JP | 2002-125105 | 4/2002 |
| JP | 2002-237951 | 8/2002 |

* cited by examiner

Primary Examiner — Albert Cutler
(74) Attorney, Agent, or Firm — Oblon, Spivak, McClelland, Maier & Neustadt, L.L.P.

(57) ABSTRACT

Two local buffers are provided between an image processing unit and an image compression and expansion unit for compression into a predetermined format. Write and read control units serve to alternately use the two local buffers. As a result, process flow starting from the image processing unit to generate compressed image data by the image compression and expansion unit requires no main memory, whereby high-speed image processing is allowed with low power consumption.

5 Claims, 9 Drawing Sheets

BACKGROUND ART

F I G . 8

BACKGROUND ART

F I G . 9

BACKGROUND ART

IMAGE PROCESSING APPARATUS HAVING A BUFFER MEMORY FOR IMAGE DATA STORAGE

CROSS-REFERENCE TO RELATED APPLICATIONS

This application is a Division of and claims the benefit of priority under 35 U.S.C. §120 from U.S. Ser. No. 10/811,840, filed Mar. 30, 2004, and claims the benefit of priority under 35 U.S.C. §119 from Japanese Patent Application No. 2003-093075, filed Mar. 31, 2003, the entire contents of each of which are incorporated herein by reference.

BACKGROUND OF THE INVENTION

1. Field of the Invention

The present invention relates to an image processing apparatus.

2. Description of the Background Art

Figure 7:
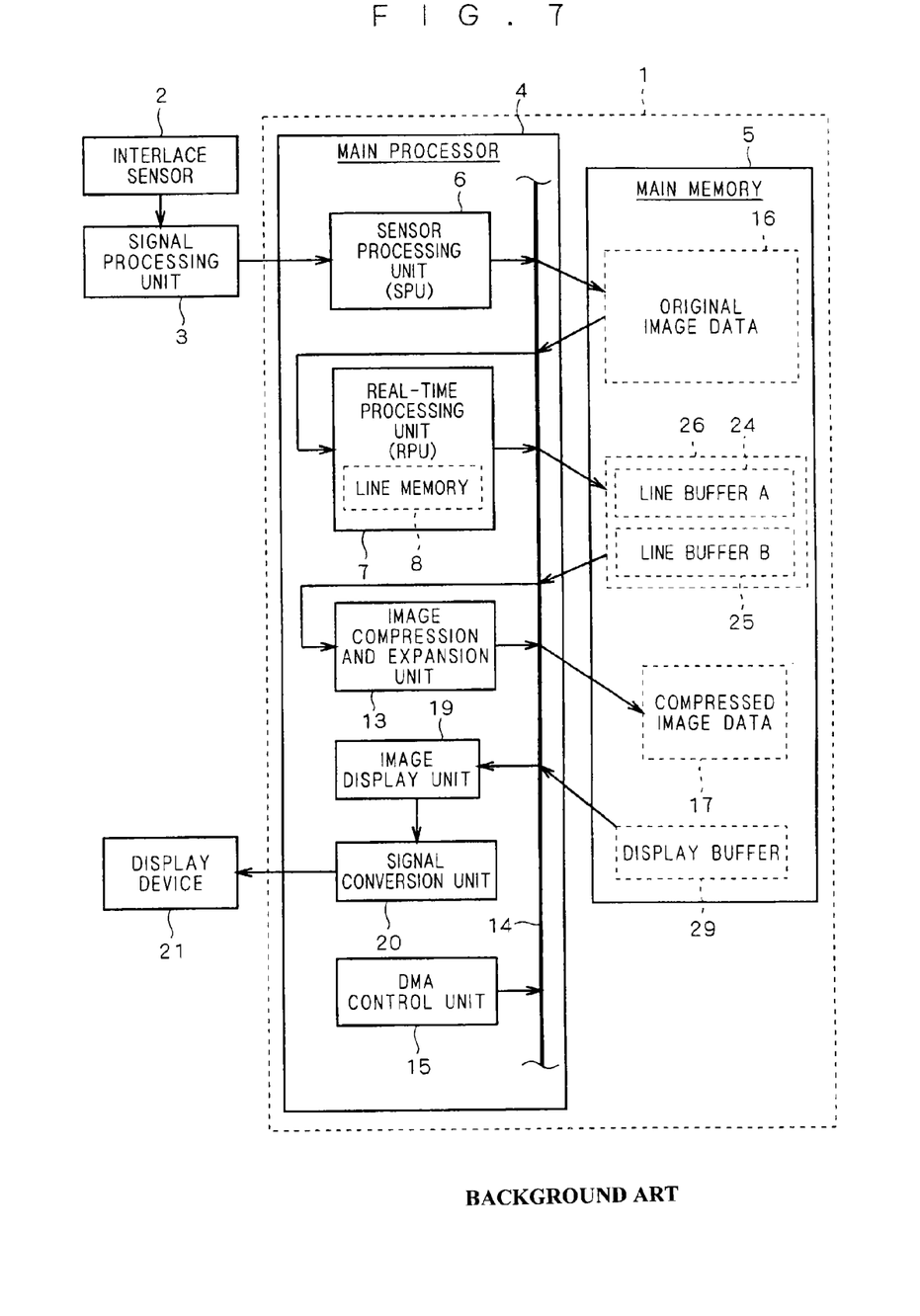
FIG. 7 schematically shows the configuration of a conventional digital camera using an interlace sensor.
Figure 8:
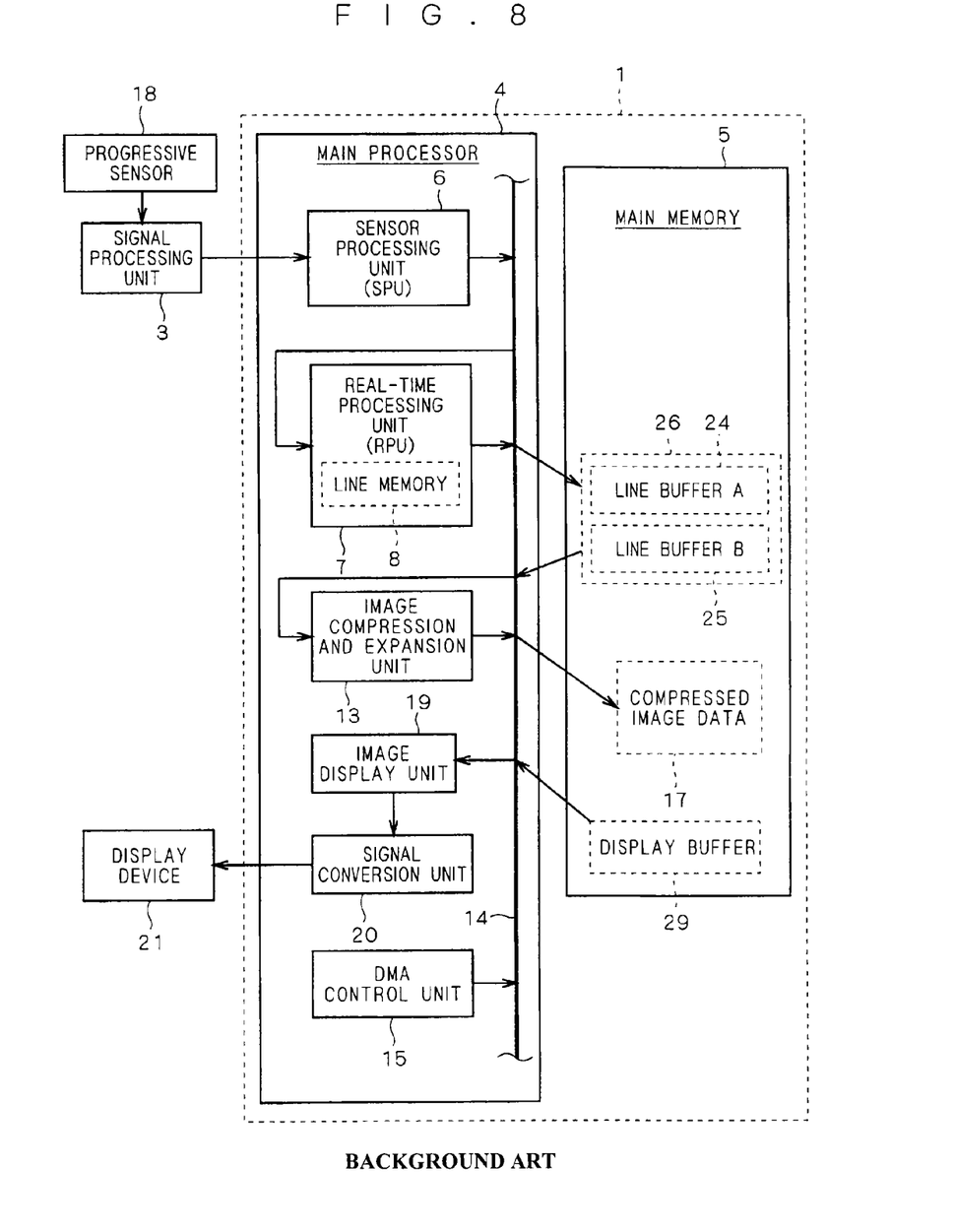
FIG. 8 schematically shows the configuration of a conventional digital camera using a progressive sensor.

In response to a recent trend towards higher pixel resolution of a digital camera, higher transmission speed and higher image processing speed of captured image data have been required. FIGS. 7 and 8 each schematically show a flow of image data captured by a conventional digital camera. An interlace sensor 2 is used as a CCD sensor for image capturing in FIG. 7, whereas a progressive sensor 18 is used in FIG. 8. With reference to FIGS. 7 and 8, image processing operation of a conventional digital camera will be discussed below.

With reference to FIG. 7, when a CCD sensor for image capturing is the interlace sensor 2, the interlace sensor 2 first converts captured information as light about a subject into a digital signal which is then outputted as image data. The outputted digital signal is subjected to noise control by correlated dual sampling, A/D conversion main processor 4. The main processor 4 comprises a sensor processing unit (hereinafter referred to as "SPU") 6 for performing signal processing such as white balance control on the received image data. Next, the processed image data is stored in a main memory 5.

The interlace sensor 2 outputs the captured image of one frame in two fields, namely, odd and even fields. However, image processing using the SPU 6 and later units requires peripheral pixel information, and hence, information only about the odd field or about the even field is not responsive to the image processing. In response, subsequent process steps are put on hold until the interlace sensor 2 outputs the image data of two fields to reproduce the image data of one frame as original image data 16 on the main memory 5.

After the image data of one frame is reproduced as the original image data 16, a real-time processing unit (hereinafter referred to as "RPU") 7 performs signal processing such as interpolation, color space conversion and pseudo color suppression on the image data written to a line memory 8 from the main memory 5. The image data processed by the RPU 7 is thereafter sent to an image compression and expansion unit 13 through line buffers A24 and B25 on the main memory 5. For compression into the JPEG (Joint Photographic Experts Group) format, the line buffers A and B each normally have a capacity of 8 lines.

More specifically, after the processed image data is sent to the line buffer A24, the RPU 7 continues to process subsequent image data read from the original image data 16, which processed data is then sent to the line buffer B25. The image data sent in advance to the line buffer A24 is concurrently sent to the image compression and expansion unit 13 and is subjected to processing therein. The RPU 7 continues to be operative to send subsequent image data to the empty line buffer A24, concurrently with which the image data sent in advance to the line buffer B25 is sent to the image compression and expansion unit 13. That is, the two line buffers A24 and B25 become alternately operative.

The image data read from the line buffers A24 and B25 are subjected to compression into a predetermined format such as JPEG at the image compression and expansion unit 13, and are thereafter sent as compressed image data 17 to the main memory 5. The compressed image data 17 is subjected to processing by an image display unit 19 and a signal conversion unit 20, whereby an image is displayed on a display device 21, or the compressed image data 17 is stored in a memory card through a memory card interface. The image display unit 19 uses a display buffer 29 as a working buffer memory.

Unlike the interlace sensor 2, the progressive sensor 18 as a CCD sensor for image capturing outputs the captured image of one frame at a time, and hence, generation of the original image data 16 on the main memory 5 is not required. Except for this, image processing using the progressive sensor 18 follows the same flow as the foregoing image processing using the interlace sensor 2.

As a result of higher pixel resolution, the CCD sensors 2 and 18 each have a growing number of pixels per horizontal line, reaching such a length that exceeds the horizontal line length of the line memory 8 of the RPU 7 in some cases. On the occurrence of such excess, regardless of whether the CCD sensor 2 or 18 is used, the image data outputted from the CCD sensor 2 or 18 cannot be directly processed by the RPU 7. In response, even in the use of the progressive sensor 18, the original image data 16 is generated once on the main memory 5, and thereafter the subsequent process steps are followed. More specifically, with reference to FIG. 9, the original image data 16 is divided into left and right regions to avoid excess of the pixels per horizontal line of the original image data 16 over the horizontal line length of the line memory 8 of the RPU 7. The left region including regional data $P_1$ through $P_{(n/2)}$ is processed first to generate a region 27 including regional data $Q_1$ through $Q_{(n/2)}$. Next, the right region including regional data $P_{(n/2)+1}$ through $P_n$ is processed to generate a region 28 including regional data $Q_{(n/2)+1}$ through $Q_n$. Finally, two regional data $R_1$ and $R_2$ on the left and right are synthesized to form intermediate data 26 of one frame on the main memory 5 which is then processed by the image compression and expansion unit 13.

As discussed, for compression of a subject image captured by a digital camera into a predetermined format such as JPEG to be displayed on a display device or stored in a memory card, image data transmission should be repeated between the main processor 4 and the main memory 5 through a bus 14. More specifically, a digital camera using the interlace sensor 2 requires five transmissions through the bus 14 as shown in FIG. 7. Even a digital camera using the progressive sensor 18 requires three transmissions.

As discussed, the CCD sensors 2 and 18 have a horizontal line of pixels reaching a length that exceeds the horizontal line length of the line memory 8 of the RPU 7, in which case the regional data $R_1$ and $R_2$ on the left and right separately processed are synthesized into the intermediate data 26 which is then held in the main memory 5. As a result, the main memory 5 should be larger in capacity than required in the case in which the CCD sensors 2 and 18 contain pixels per horizontal line which do not reach the horizontal line length of the line memory 8 of the RPU 7.

The foregoing data transmissions are handled by a DMA control unit 15 which realizes high-speed DMA transmission through the bus 14 with no intervention of a CPU. However, when the CCD sensors 2 and 18 are a 5-megapixel-class CCD sensor with 2560 pixels high by 1920 pixels wide each storing 16 bits of information, for example, the image data outputted from the CCD sensor 2 or 18 contains information as much as about 10 megabytes. In light of a recent trend towards still higher pixel resolution of the CCD sensors 2 and 18, repetition of transmission of such high-volume data causes heavily places a burden on a bus band, thus leading to increase in power consumption, lower processing speed, and the like.

SUMMARY OF THE INVENTION

The present invention is intended for an image processing apparatus in which an image processing unit writes image data to a buffer memory, and a compression unit reads the image data from the buffer memory to perform compression thereon.

According to the present invention, the image processing apparatus comprises: an image processing part for performing image processing on captured data of an image; and a storage unit provided outside the image processing part. The image processing part includes: an image processing unit for performing a predetermined process on the captured data to obtain image data, and outputting the image data; a buffer memory for storing the image data sent from the image processing unit; and a compression unit for compressing the image data read from the buffer memory.

Accordingly, high-speed processing of the image data is realized without using the storage unit. Reduction in power consumption is allowed as well.

According to one aspect of the present invention, the buffer memory includes two buffer memories. The image processing apparatus further comprises a control unit for controlling read and writing to and from these two buffer memories. The control unit is operative in such a manner that while the image processing unit writes image data to either one of the two buffer memories, the compression unit selectively reads image data previously stored in the other one of the two buffer memories. As a result, the image processing unit and the compression unit are both allowed to perform sequential image processing without the need for waiting for completion of data transmission to the buffer memories.

It is therefore an object of the present invention to provide an image processing apparatus realizing high-speed image processing with low power consumption.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
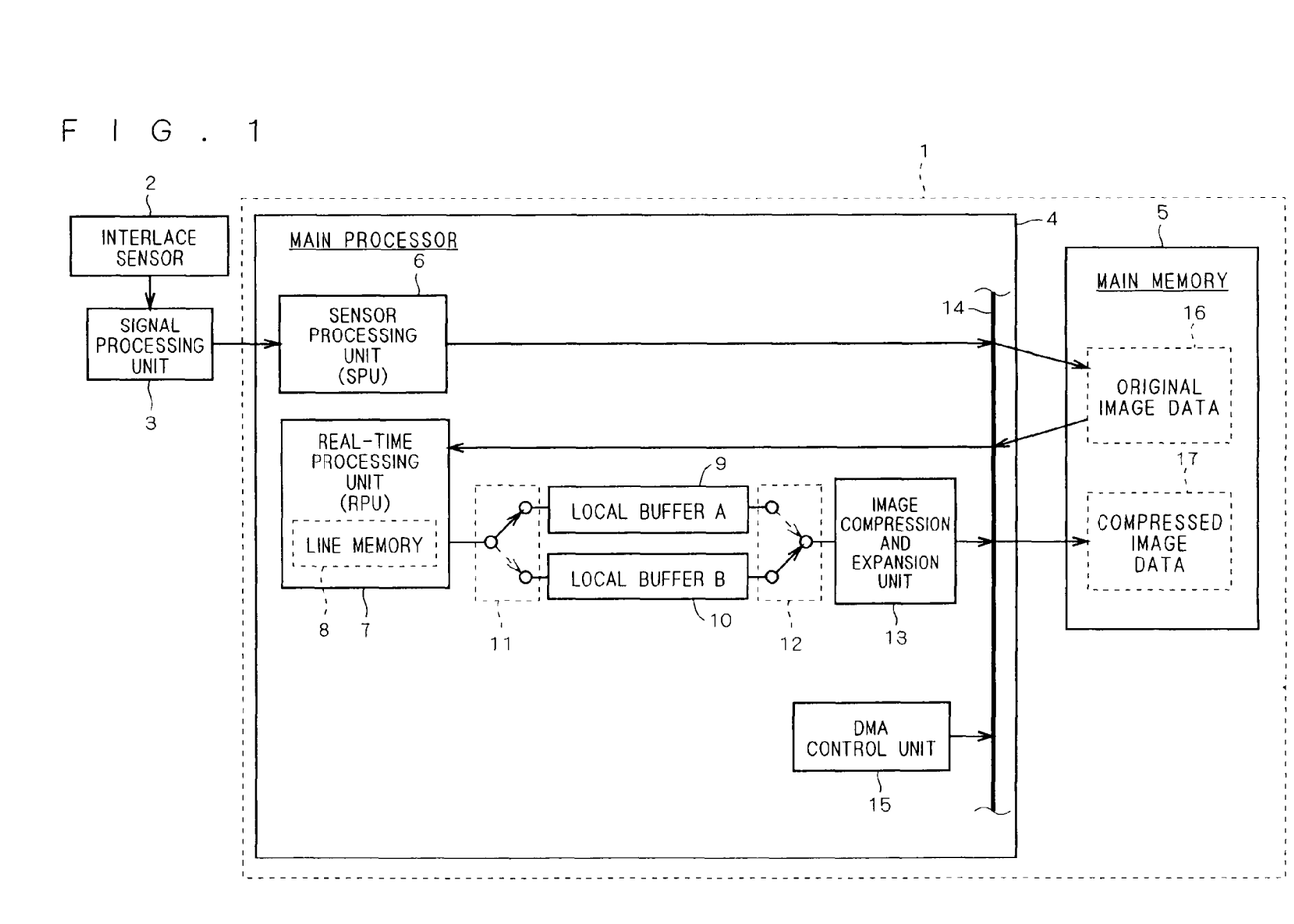
FIG. 1 schematically shows the configuration of a digital camera using an interlace sensor according to a first preferred embodiment of the present invention.

FIG. 1 schematically shows a digital camera comprising an image processing apparatus 1 according to a first preferred embodiment of the present invention. In FIG. 1, arrows indicate flow of image data captured by the digital camera. With reference to FIG. 1, the image processing apparatus 1 comprises a main processor 4 and a main memory 5. The image processing apparatus 1 is connected through a signal processing unit 3 to an interlace sensor 2.

The main processor 4 comprises an SPU 6, an RPU 7 including a line memory 8, an image compression and expansion unit 13, a local buffer A9 (first buffer memory) and a local buffer B10 (second buffer memory) serving to transmit data between the RPU 7 and the image compression and expansion unit 13, a write control unit 11 and a read control unit 12 for selecting which one of the two local buffers A9 or B10 to use, a bus 14 for data transmission, and a DMA control unit 15 for controlling data transmission through the bus 14 between the main processor 4 and the main memory 5.

The main memory 5 serves to temporarily store original image data 16 generated in the main processor 4 by data processing of odd and even fields sent from the interlace sensor 2 through the signal processing unit 3, and compressed image data 17 sent from the image compression and expansion unit 13.

Except for the two local buffers A9 and B10 provided between the RPU 7 and the image compression and expansion unit 13, and operation of the main memory 5 as a line buffer, the digital camera of the first preferred embodiment has the same configuration as that of the conventional digital camera.

Though not specifically shown, the main processor 4 further comprises a CPU for various types of operations, an external memory card for storing captured image data, hardware serving as an interface for storage into the external memory card, and a storage device for storing a software program.

The operation of the image processing apparatus 1 having the foregoing configuration will be discussed below.

In the main processor 4, the SPU 6 receives image data from the interlace sensor 2 through the signal processing unit 3 to generate the original image data 16 on the main memory 5. Next, the RPU 7 stores image data in the line memory 8 read from the original image data 16 and performs signal processing thereon such as interpolation, color space conversion and pseudo color suppression. These process steps are the same as those followed by the conventional digital camera discussed with reference to FIG. 7. Unlike the conventional digital camera, the digital camera of the first preferred embodiment sends the processed image data to the local buffers A9 and B10 in the main processor 4, not to the line buffers A24 and B25 in the main memory 5.

More specifically, the processed image data of 8 lines is sent to the local buffer A9. The RPU 7 thereafter continues to process subsequent image data of 8 lines read from the original image data 16, and sends the processed image data to the local buffer B10. Concurrent with transmission of the image data from the RPU 7 to the local buffer B10, the image data stored in the local buffer A9 is sent to the image compression and expansion unit 13 for compression into a predetermined format such as JPEG. The compressed image data is thereafter sent to the main memory 5. The RPU 7 still continues to process subsequent image data of 8 lines read from the original image data 16 and send the processed image data to the empty line buffer A9. The image data stored in the local buffer B10 is concurrently sent to the image compression and expansion unit 13 for compression into a predetermined format such as JPEG. The compressed image data is thereafter sent to the main memory 5. That is, while the RPU 7 sends image data either to the local buffer A9 or to B10, image data stored either in the local buffer B10 or in A9 is sent to the image compression and expansion unit 13 to be compressed therein. These operations are repeatedly performed, whereby the compressed image data 17 is generated on the main memory 5.

Figure 2:
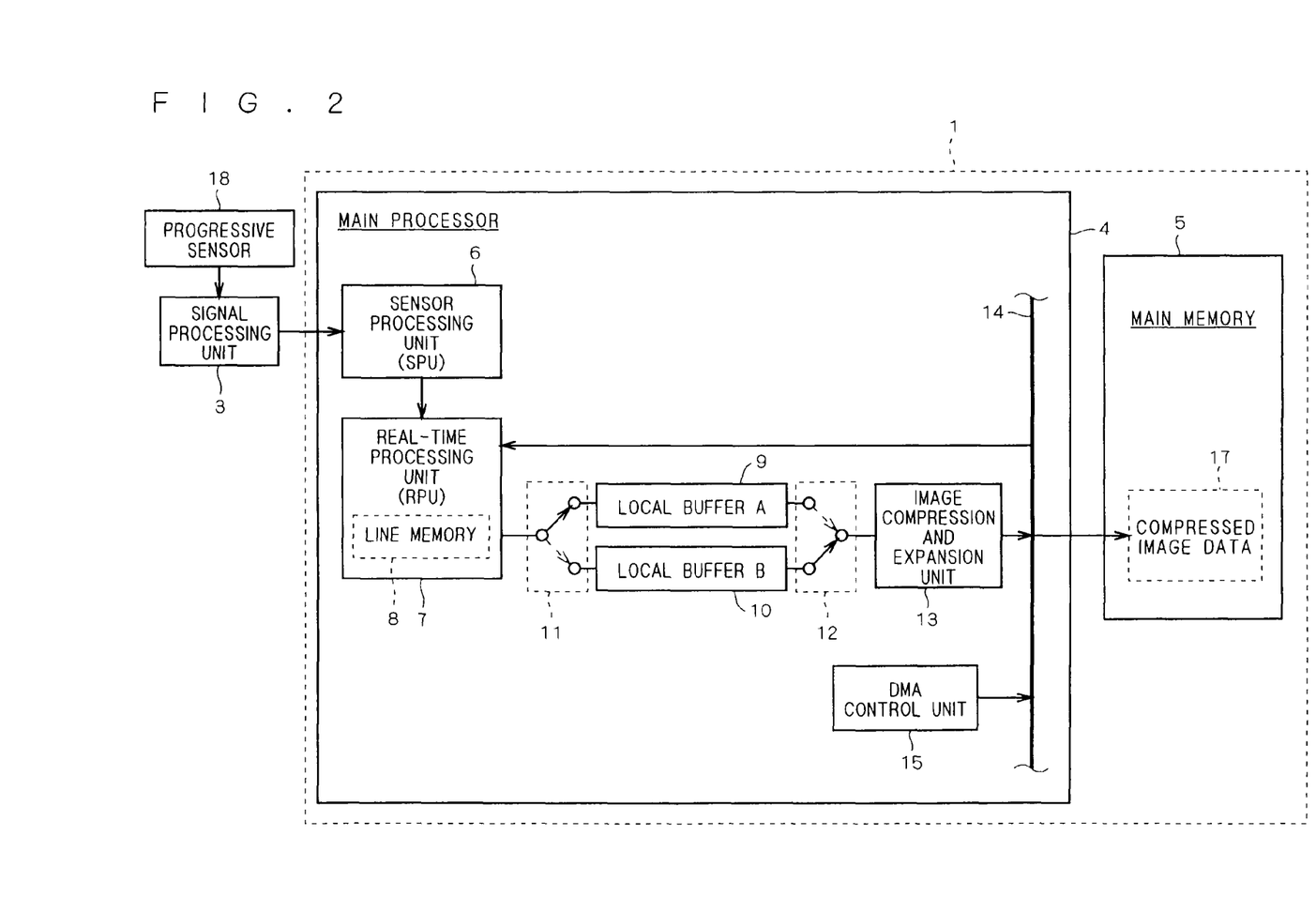
FIG. 2 schematically shows the configuration of a digital camera using a progressive sensor according to the first preferred embodiment.

FIG. 2 shows the configuration of a digital camera using a progressive sensor 18 as a CCD sensor. Except for the progressive sensor 18, the digital camera shown in FIG. 2 has the same configuration as that of the digital camera of FIG. 1. In FIG. 2, constituent elements which are operative in the same manner as those of FIG. 1 are designated by the same reference numerals. The operation of the digital camera using the progressive sensor 18 is the same as that of the digital camera using the interlace sensor 2, with exception that no original image data 16 is required, and data from the SPU 6 is directly sent to the RPU 7 to be processed therein.

The write and read control units 11 and 12 select which one of the two local buffers A9 or B10 to use by making connection to the RPU 7 and the image compression and expansion unit 13.

The line buffers A9 and B10 are only required to be not less than image data processed at one time by the RPU 7 in horizontal line length. More specifically, as long as the local buffers A9 and B10 have a horizontal line not less than one horizontal line of pixels of the CCD sensors 2 and 18, the local buffers A9 and B10 may be the same as or shorter than in horizontal line length the line memory 8 of the RPU 7. By way of example, when the CCD sensors 2 and 18 are a 5-megapixel-class CCD sensor with 2560 horizontal pixels, and the line memory 8 of the RPU 7 has a horizontal line length with 4096 pixels, the horizontal line length of the local buffers A9 and B10 may contain 2600 pixels or 4096 pixels, as long as it is not less than the length of 2560 pixels.

As discussed, the use of the local buffers A9 and B10 reduces the number of DMA transmissions of image data between the main processor 4 and the main memory 5 under control by the DMA control unit 15 until the compressed image data 17 is generated. That is, the conventional digital camera requires five transmissions in the use of the interlace sensor 2 and three transmissions in the use of the progressive sensor 18 as shown in FIGS. 7 and 8, respectively, whereas with reference to FIGS. 1 and 2, the digital camera of the first preferred embodiment only requires three transmissions and one transmission in the use of the interlace sensor 2 and the progressive sensor 18, respectively. A burden placed on a bus band is lightened accordingly, whereby high-speed image processing is realized. The first preferred embodiment further advantageously serves to reduce the frequency of use of the main memory 5 generally operating at a higher voltage than the main processor 4 as well as to reduce the number of operations of the DMA control unit 15, thereby reducing power consumption of the image processing apparatus 1 as a whole. Additionally, provision of two local buffers allows continuous process flow from the SPU 6 to the image compression and expansion unit 13, thereby advantageously realizing high-speed image processing.

Second Preferred Embodiment

Under the conditions that the progressive sensor 18 is used as a CCD sensor, and the progressive sensor 18 has a horizontal line of pixels that does not exceed in length the horizontal line of the local buffers A9 and B10, the first preferred embodiment allows real-time data processing flow from the SPU 6 to the image compression and expansion unit 13 by way of the local buffers A9 and B10 without generating the original image data 16 once on the main memory 5 as shown in FIG. 2. When the CCD sensors 2 and 18 have a horizontal line of pixels that exceeds in length the horizontal line length of the local buffers A9 and B10, however, data sent from the RPU 7 cannot completely be stored in the local buffers A9 and B10, whereby such sequential processing becomes impossible.

In a second preferred embodiment of the present invention, it will be discussed what process a digital camera follows to handle the case in which the CCD sensors 2 and 18 have a horizontal line of pixels exceeding in length the horizontal line length of the local buffers A9 and B10.

Figure 3:
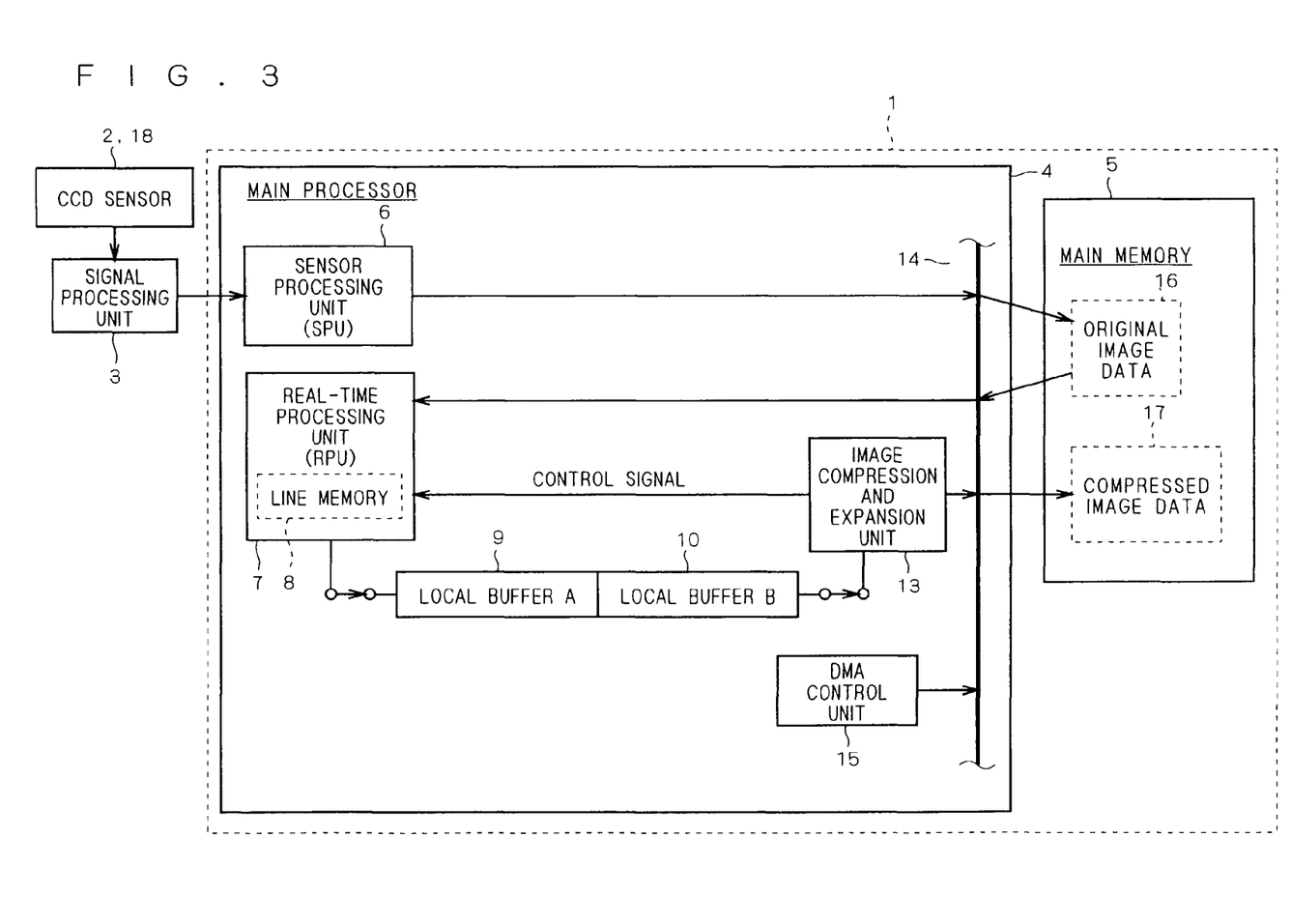
FIG. 3 schematically shows the configuration of a digital camera according to a second preferred embodiment of the present invention.

FIG. 3 schematically shows a digital camera comprising an image processing apparatus 1 according to the second preferred embodiment. In FIG. 3, arrows indicate flow of image data captured by the digital camera. The image processing apparatus 1 of the second preferred embodiment has the same configuration as that of the first preferred embodiment, whereas the local buffers A9 and B10 are operative in different ways between the first and second preferred embodiments. In FIG. 3, constituent elements which are operative in the same manner as those of FIGS. 1 and 2 are designated by the same reference numerals.

As an example, assuming that the CCD sensors 2 and 18 are a 6-megapixel-class CCD sensor with 3072 pixels per horizontal line, that the line memory 8 of the RPU 7 contains 4096 pixels per horizontal line, and that the local buffers A9 and B10 each have 2600 pixels per horizontal line responsive only to a 5-megapixel-class CCD with 2560 pixels per horizontal line, the local buffers A9 and B10 are overflowed with data sent from the RPU 7 which prevents process flow. In response, in the second preferred embodiment, the two local buffers A9 and B10 together serve as one continuous buffer memory as shown in FIG. 3. As a result, the horizontal line length of the local buffers A9 and B10 becomes responsive to data up to 5200 pixels per horizontal line which is twice the horizontal line length of each one of the local buffers A9 and B10.

The use of the local buffers A9 and B10 as one continuous buffer memory does not allow the RPU 7 and the image compression and expansion unit 13 to follow sequential process flow by means of the alternate use of the two local buffers A9 and B10 as discussed in the first preferred embodiment. In response, a control signal is transmitted between the RPU 7 and the image compression and expansion unit 13.

More specifically, the RPU 7 first processes image data of one line read from the original image data 16, and sends the processed image data to the buffer memory as a unity of the two local buffers A9 and B10. At the time when data transmission is completed, the RPU 7 stops the operation. The image compression and expansion unit 13 serves to process the data read from the buffer memory. After receipt of all the data in the buffer memory, the image compression and expansion unit 13 sends a control signal to the RPU 7 notifying completion of data readout. On receipt of this control signal, the RPU 7 again processes image data read from the original image data 16, and sends the processed image data to the buffer memory.

The second preferred embodiment is applicable even in the use of the progressive sensor 18 as a CCD sensor. More specifically, data from the SPU 6 is not directly sent to the RPU 7, but is sent to the main memory 5 once to generate the original image data 16.

In FIG. 3, the two local buffers A9 and B10 are conceptually shown as one buffer memory in physical connection in a horizontal direction. The actual use of the local buffers A9 and B10 is such that under control by a software program, for example, the RPU 7 sends data to the local buffer A9, and overflow data from the local buffer A9 is sequentially sent to the local buffer B10. This process flow is also followed in reading to the image compression and expansion unit 13. When the write and read control units 11 and 12 are collectively controlled, the second preferred embodiment is feasible in the configurations shown in FIGS. 1 and 2. That is, the configurations of FIGS. 1 and 2 can be subjected to the process flows of the first and second preferred embodiments.

The second preferred embodiment has been described in the use of the two local buffers A9 and B10 as discussed in the first preferred embodiment. As the simplest way to use a buffer memory, one local buffer may be provided in the image processing apparatus 1 that has the same capacity as that of the line memory 8 of the RPU 7. The second preferred embodiment is also feasible by the use of such a local buffer and the foregoing control signal.

As discussed, even when the CCD sensors 2 and 18 have high pixel resolution with a horizontal line of pixels exceeding in length the horizontal line length of the two local buffers A9 and B10, the foregoing use of one buffer memory as a unity of the local buffers A9 and B10 realizes image processing. Even when only one buffer memory is prepared which has a horizontal line length exceeding the length of one horizontal line of pixels of the CCD sensors 2 and 18, the use of the foregoing control signal realizes image processing. Like the first preferred embodiment, data transmission between the RPU 7 and the image compression and expansion unit 13 does not require the main memory 5 and the bus 14. A burden placed on a bus band is lightened accordingly, whereby high-speed image processing and reduction in power consumption are realized.

Third Preferred Embodiment

In the first and second preferred embodiments, the local buffers A9 and B10 serve to transmit data from the RPU 7 to the image compression and expansion unit 13. The local buffers A9 and B10 may be operative for another processing performed in the main processor 4. In a third preferred embodiment of the present invention, the local buffers A9 and B10 are operative for image display on a display device 21.

For visual recognition of a subject to be captured, a digital camera may use an electronic viewfinder or a liquid crystal display. With reference to FIGS. 7 and 8, in the conventional way of such visual recognition, image data sent from the CCD sensor 2 or 18 passes through the signal processing unit 3 and the SPU 6, and is thereafter sent through the bus 14 to the image display unit 19 for conversion. The converted image data is further sent through the signal conversion unit 20 to the display device 21 such as an electronic viewfinder or a liquid crystal display, whereby an image is reproduced on the display device 21.

For the purpose of visual recognition of a subject to be captured, reproduction of the subject should be continuously made on the display device 21, and should not be limited to a capturing period. Accordingly, data should be continuously sent to the image display unit 19, thus heavily placing a burden on the bus 14 serving for this data transmission.

In response, in the third preferred embodiment, the local buffers A9 and B10 serve to transmit data to the image display unit 19 to lighten a burden on a bus band.

Figure 4:
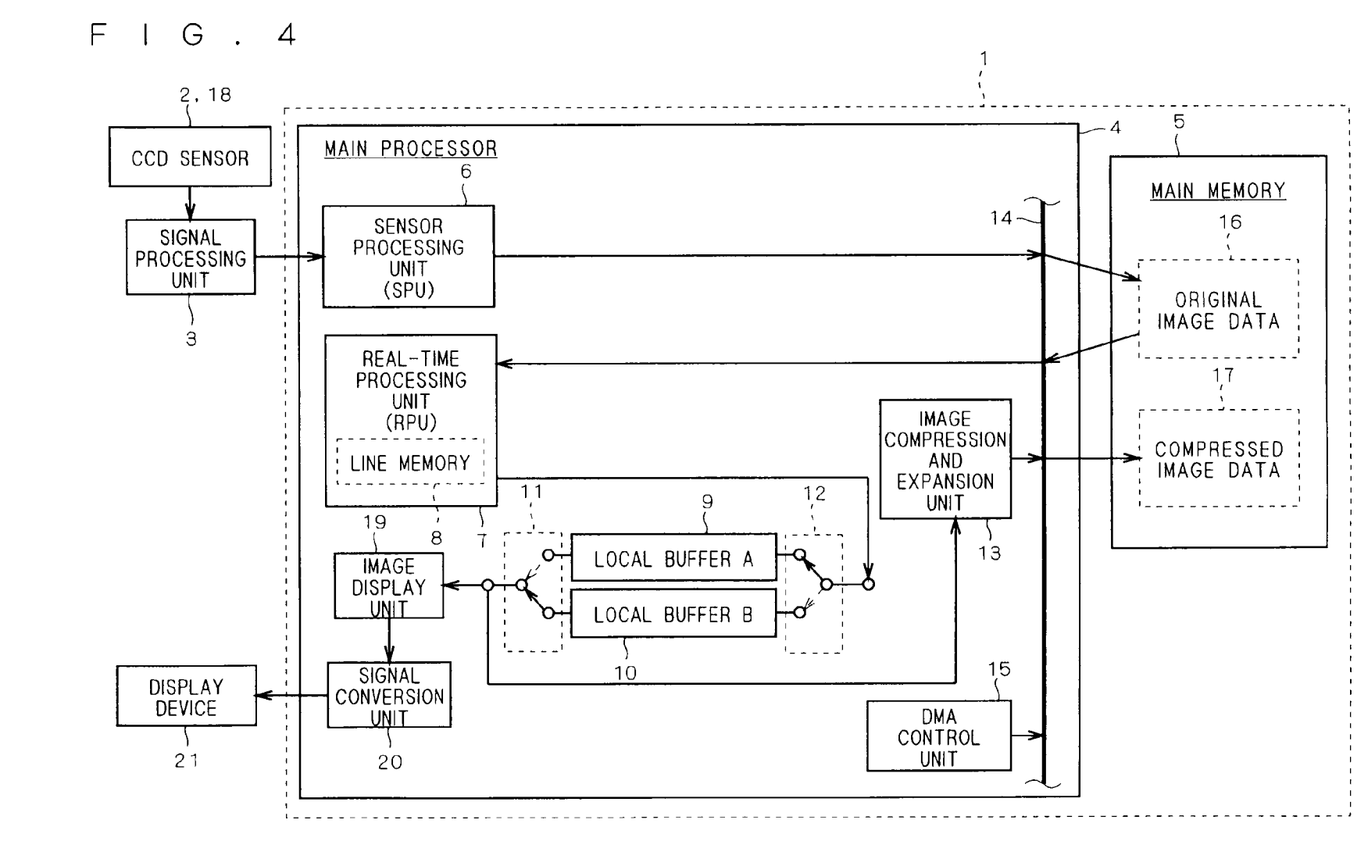
FIG. 4 schematically shows the configuration of a digital camera according to a third preferred embodiment of the present invention.

FIG. 4 schematically shows a digital camera comprising an image processing apparatus 1 according to the third preferred embodiment. In FIG. 4, arrows indicate flow of image data captured by the digital camera. Constituent elements which are operative in the same manner as those of FIGS. 1, 2 and 3 are designated by the same reference numerals.

Image data sent from the CCD sensor 2 or 18 is subjected to the processing at the SPU 6. The processed image data is thereafter sent to the RPU 7 after generation of the original image data 16 in the use of the interlace sensor 2, whereas in the use of the progressive sensor 18, it is directly sent to the RPU 7. The captured image data from the RPU 7 is sent through the local buffers A9 and B10 to the image compression and expansion unit 13 and to the image display unit 19. The captured image data is subjected to the processing at the image compression and expansion unit 13 during image capturing, whereas in visual recognition of a subject to be captured, it is subjected to the processing at the image display unit 19. During visual recognition of a subject to be captured, display on the display device 21 is required to be at such a level that allows recognition of a subjected to be captured, and does not require data corresponding to millions of pixels sent from the CCD sensor 2 or 18. Accordingly, image data sent from the RPU 7 during visual recognition is skipped with 240 pixels high by 320 pixels wide, for example. The skipped image data is subjected to the sequential process flow as discussed in the first preferred embodiment including writing from the RPU 7 and reading to the image display unit 19 by means of alternate use of the two local buffers A9 and B10 under control by the write and read control units 11 and 12.

Continuity between the RPU 7 and the local buffers A9 and B10, and continuity between the local buffers A9 and B10, and the image compression and expansion unit 13 and the image display unit 19, are controlled by purpose-built hardware and a purpose-built software program having a switching function of continuity such as the write and read control units 11 and 12.

The output from the RPU 7 is sent to the local buffers A9 and B10, and the output from the local buffers A9 and B10 is selectively sent either to the image compression and expansion unit 13 or to the image display unit 19. That is, the local buffers A9 and B10 are selectively available either to the image compression and expansion unit 13 or to the image display unit 19. More specifically, between the image compression and expansion unit 13 and the image display unit 19, the local buffers A9 and B10 are allocated to the one placing a heavier burden on the bus 14.

As discussed, data from the RPU 7 is directly sent through the local buffers A9 and B10 to the image display unit 19 without data transmission through the bus 14 for image reproduction as required in the conventional digital camera. A burden placed on a bus band is lightened accordingly, to thereby reduce power consumption. The lightened burden on a bus band further advantageously leads to enhanced processing speed of the image processing apparatus 1 as a whole.

Fourth Preferred Embodiment

Figure 9:
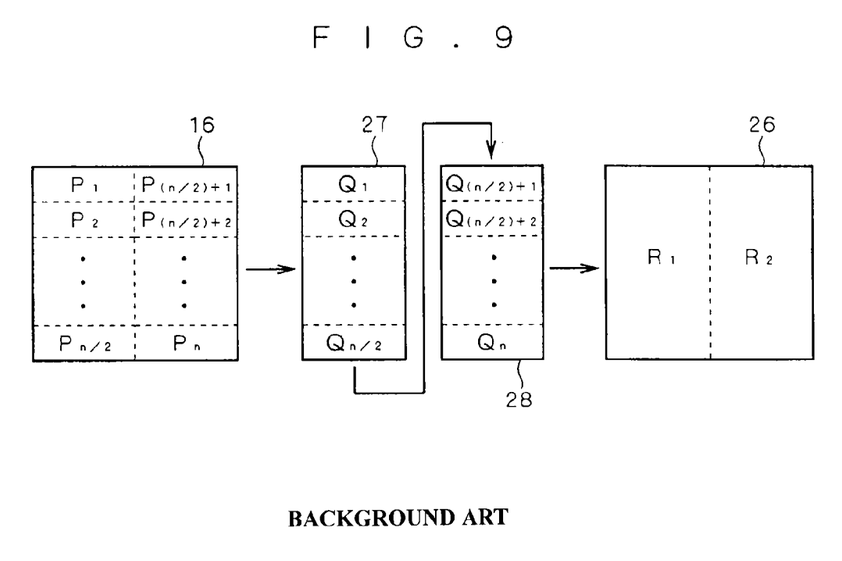
FIG. 9 shows conventional process flow of regional data.

As discussed in the description of the background art with reference to FIG. 9, in response to the case in which the CCD sensors 2 and 18 have a horizontal line of pixels exceeding in length the horizontal line length of the line memory 8 of the RPU 7, the original image data 16 is divided into left and right regions. These left and right regions are separately processed at the RPU 7 by means of the line memory 8 to generate the intermediate data 26 on the main memory 5. The intermediate data 26 is subsequently subjected to the processing at the image compression and expansion unit 13 to generate the compressed image data 17. Such process flow can handle the CCD sensors 2 and 18 having a horizontal line of pixels exceeding in length the horizontal line length of the line memory 8 of the RPU 7, whereas a region for storing the high-volume intermediate data 26 is required in the main memory 5 that contains pixels corresponding in number to those of the CCD sensors 2 and 18. In response, in a fourth preferred embodiment of the present invention, it will be discussed how the original image data 16 is processed without requiring such high-volume intermediate data.

Figure 5:
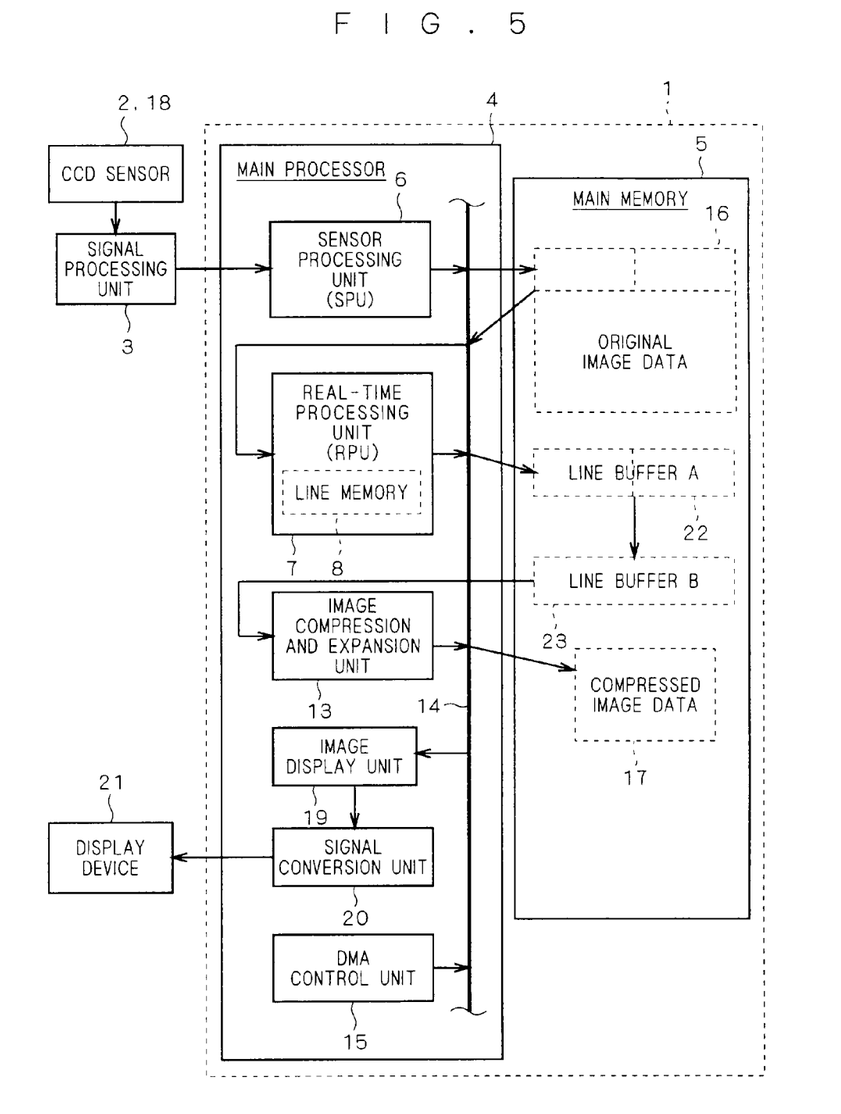
FIG. 5 schematically shows the configuration of a digital camera according to a fourth preferred embodiment of the present invention.
Figure 6:
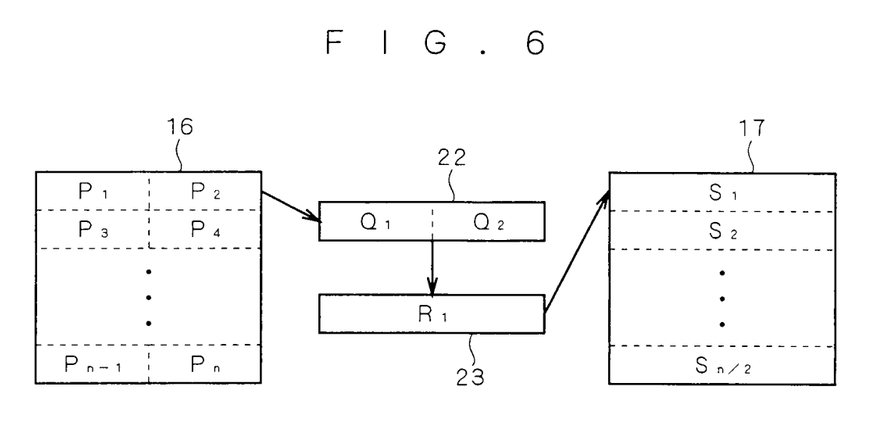
FIG. 6 shows process flow of regional data according to the fourth preferred embodiment.

FIG. 5 schematically shows a digital camera comprising an image processing apparatus 1 according to the fourth preferred embodiment. In FIG. 5, arrows indicate flow of image data captured by the digital camera. Constituent elements which are operative in the same manner as those of FIGS. 1, 2, 3 and 4 designated by the same reference numerals. FIG. 6 is an explanatory view sequentially showing generation of data on the main memory 5. With reference to FIGS. 5 and 6, the operation of the digital camera according to the fourth preferred embodiment will be discussed below.

When the CCD sensors 2 and 18 have a horizontal line of pixels exceeding in length the horizontal line length of the line memory 8 of the RPU 7, and thus process flow cannot sequentially proceed from the SPU 6 to the RPU 7, the original image data 16 is generated once in the main memory 5 regardless of whether the CCD sensor 2 or 18 is used. Next, the original image data 16 is divided and is then subjected to the processing at the RPU 7 by means of the line memory 8. With reference to FIG. 6, the original image data 16 is divided into left and right regions in two columns. The left and right regions are each further horizontally divided into regions of 8 lines. Hence, assuming that the CCD sensors 2 and 18 contain 5000 pixels per horizontal line, for example, data to be actually processed contains half the number, namely, 2500 pixels per horizontal line. As a result, the RPU 7 becomes operative even when the line memory 8 has a capacity of as small as 4096 pixels. Regional data $P_1$ shown in FIG. 6 after being subjected to the processing at the RPU 7 is written as data $Q_1$ to a line buffer A22 in the main memory 5. Unlike the conventional way which subsequently processes regional data $P_3$, regional data $P_2$ is subsequently processed and is added as data $Q_2$ to the line buffer A22 on the main memory 5. As a result, intermediate data $R_1$ (23) of 8 lines is generated in the main memory 5 that has a horizontal line length of pixels corresponding in number to those of the horizontal line of the CCD sensors 2 and 18. The image compression and expansion unit 13 handles data on a block unit basis of 8 pixels high by 8 pixels wide, and hence, is capable of handling data $R_1$ to generate data $S_1$. These process steps are sequentially performed until the compressed image data 17 is generated.

As discussed, the RPU 7 processes the regional data including $P_1, P_2, \ldots$, and the resultant data $R_1, R_2, \ldots$ are subjected to the processing at the image compression and expansion unit 13. Even when the CCD sensors 2 and 18 have a horizontal line of pixels exceeding in length the horizontal line length of the line memory 8, process flow continues without waiting for generation of intermediate data of one frame on the main memory 5 as required in the conventional digital camera. The fourth preferred embodiment further advantageously lowers working buffer capacity in the main memory 5. Still further, provision of two lines buffers A22 and B23 in the main memory 5, and alternate use of these buffers A22 and B23 as discussed with reference to the local buffers A9 and B10 in the first and second preferred embodiments realize image processing with still higher speed.

Fifth Preferred Embodiment

The CCD sensors 2 and 18 may have a horizontal line of pixels exceeding in length the line memory 8 of the RPU 7 as a result of higher pixel resolution of the CCD sensors 2 and 18, in which case the fourth preferred embodiment devises reading of image data from the original image data 16 to realize image processing. However, the fourth preferred embodiment requires a region for storing intermediate data in the main memory 5, thereby placing a heavier burden on the bus 14 and causing higher power consumption than the first and second preferred embodiments using the local buffers A9 and B10. A fifth preferred embodiment of the present invention as a combination of the second and fourth preferred embodiments is responsive to these problems.

As a circuit configuration of a digital camera, the fifth preferred embodiment employs the one shown in FIG. 3 discussed in the second preferred embodiment. As to image processing, only the reading flow of the original image data 16 discussed in the fourth preferred embodiment with reference to FIG. 6 is adopted.

More specifically, the original image data 16 generated on the main memory 5 after passing through the CCD sensor 2 or 18 and the SPU 6 is read as the regional data $P_1$ and $P_2$ in this order as shown in FIG. 6. The regional data $P_1$ and $P_2$ thereby read are subjected to the processing at the RPU 7 by means of the line memory 8. The processed data are sent to the local buffers A9 and B10, not to the line buffer A22 in the main memory 5. At this stage, the data $R_1$ (23) shown in FIG. 6 is generated in the local buffers A9 and B10. At the time when data transmission is completed, the RPU 7 stops reading of the original image data 16. Next, the image compression and expansion unit 13 reads the data from the local buffers A9 and B10 and performs compression thereon. The compressed data is thereafter sent as the compressed image data 17 to the main memory 5. As this stage, the data $S_1$ shown in FIG. 6 is generated as the compressed image data 17 on the main memory 5. At the time when data readout from the local buffers A9 and B10 is completed, the image compression and expansion unit 13 sends a control signal notifying completion of data readout. On receipt of this control signal, the RPU 7 continues to read the regional data $P_3$ and $P_4$ from the original image data 16, and performs image processing thereon. The processed data are sent to the local buffers A9 and B10. These process steps are repeatedly performed, whereby only the compressed image data 17 is generated on the main memory 5 without generating the intermediate data 26.

The fifth preferred embodiment has been discussed as a combination of the fourth and second preferred embodiments. As long as the CCD sensors 2 and 18 have a horizontal line of pixels that does not exceed in length the horizontal line length of the local buffers A9 and B10, the first preferred embodiment may alternatively be combined with the fourth preferred embodiment. Still alternatively, a combination of the third and fourth preferred embodiments will be applicable.

As discussed, the use of the local buffers A9 and B10 of the second preferred embodiment combined with the fourth preferred embodiment eliminates the need for generating intermediate data on the main memory 5. Such combination further advantageously lightens a burden to be placed on the bus 14 and reduces power consumption.

While the invention has been shown and described in detail, the foregoing description is in all aspects illustrative and not restrictive. It is therefore understood that numerous modifications and variations can be devised without departing from the scope of the invention.

What is claimed is:

1. An image processing apparatus for performing image processing on captured data of an image of a desired subject, comprising:
   an image processing part including
   a buffer memory for data storage;
   an image processing unit for performing a predetermined process on said captured data to obtain image data, and writing said image data to said buffer memory;
   a compression unit for compressing said image data read from said buffer memory; and
   a storage unit provided outside said image processing part, wherein said buffer memory includes two buffer memories, said image processing apparatus further comprising:
   a control unit for reading and writing said image data using said two buffer memories as one continuous buffer memory,
   wherein after said image data in predetermined amount is written to said continuous buffer memory, said image processing unit suspends writing until receipt of a control signal, and
   wherein after said image data is read from said continuous buffer memory, said compression unit sends said control signal to said image processing unit.

2. The apparatus according to claim 1, comprising:
an output of said buffer memory connected to an input of said compression unit.

3. The apparatus according to claim 1, comprising:
said compression unit outputting compressed data to said storage unit.

4. The apparatus according to claim 1, comprising:
said two buffer memories serially connected together.

5. The apparatus according to claim 1, comprising:
a horizontal line length of said continuous buffer memory being a sum of horizontal line lengths of said two buffer memories.

* * * * *